Sept. 13, 1949.                C. DORSMAN ET AL                    2,481,912
                    PHASE COMPARATOR COMPRISING AN ALTERNATING
                            CURRENT BRIDGE CIRCUIT
                            Filed April 26, 1946

INVENTOR
CORNELIS DORSMAN
PIETER HEERTJE DIJKSTERHUIS
BY
AGENT

Patented Sept. 13, 1949

2,481,912

UNITED STATES PATENT OFFICE 2,481,912

PHASE COMPARATOR COMPRISING AN ALTERNATING CURRENT BRIDGE CIRCUIT

Cornelis Dorsman and Pieter Heertje Dijksterhuis, Eindhoven, Netherlands, assignors, by mesne assignments, to Hartford National Bank and Trust Company, Hartford, Conn., as trustee Application April 26, 1946, Serial No. 665,014
In the Netherlands October 7, 1942

Section 1, Public Law 690, August 8, 1946
Patent expires October 7, 1962

10 Claims. (Cl. 172—245)

1

This invention relates to a phase indicating circuit arrangement for converting the phase difference between two alternating voltages having differing amplitudes into a direct current where amplitude depends on said phase difference and may be used with particular advantage for the control of a zero indicator in alternating current bridge circuits so as to determine on which side the balance of the bridge circuit is disturbed.

One preferred embodiment of a phase indicator according to the invention includes two rectifiers oppositely connected in series, the alternating voltage having the largest amplitude (hereinafter referred to as the comparison voltage) being supplied to one of the rectifiers and the other alternating voltage (hereinafter referred to as the measuring voltage) to the series combination of the rectifiers, the direct current output circuit being connected in parallel with the series combination of the rectifiers.

This circuit arrangement is practically independent of frequency and a further advantage consists in that in the case of a sinusoidal measuring voltage the output current increases linearly with the amplitude of the measuring alternating voltage.

For the production of a direct current whose polarity is reversed by a change of 180° in the phase difference between the comparison and the measuring voltages use is made of two parallel-connected phase indicators each including a series combination of rectifiers having a common direct current output circuit The rectifiers in the series combination of one phase indicator are oppositely connected while the rectifiers in the series combination of the other phase indicator are oppositely connected in reverse order with respect to those in the first phase indicator. The measuring voltage is applied in parallel and therefore in phase coincidence to the series combinations of both indicators while the comparison voltage is fed in push-pull and therefore in phase opposition to corresponding rectifiers in each series combination.

In order that the invention may be clearly understood and readily carried into effect it will now be described more fully with reference to the accompanying drawing, in which two circuit arrangements according to the invention are illustrated.

Figure 1:
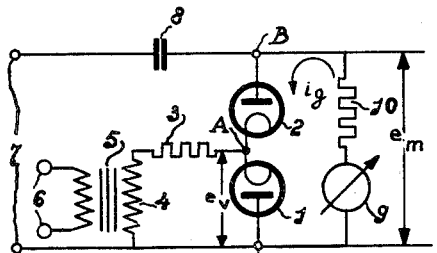
Figures 1 and 2 show two circuit arrangements according to the invention each comprising one pair of rectifiers.
Figure 2:
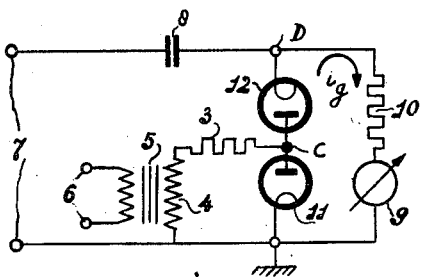

Referring to Figure 1, 1 and 2 designate two rectifiers which are oppositely connected in series and which for simplicity are shown as diodes. Connected between the cathode and the anode of the rectifier 1 is the series combination of a current limiting resistance 3 and the secondary 4 of a transformer 5 to whose primary the comparison alternating voltage $e_v$ is supplied across input terminals 6. The measuring alternating voltage $e_m$ is supplied to input terminals 7 and thus through a blocking condenser 8 to the series combination of rectifiers 1, 2. The series combination of rectifiers 1 and 2 has connected in parallel with it a direct current output circuit comprising a direct current ammeter 9 and a series resistance 10.

If there is no phase difference between the comparison voltage applied to the rectifier 1 and the measuring voltage applied to the series combination of the rectifiers 1 and 2 and further, if otherwise the comparison voltage has a larger amplitude than the measuring alternating voltage the output circuit has no current passing through it. If however there is a phase displacement between the two applied alternating voltages the output circuit has passing through it a direct current $i_g$ in the direction denoted by an arrow, the magnitude of this current depending on the phase displacement and being at maximum with a phase displacement of 180° between the applied alternating voltages.

Figure 3A:
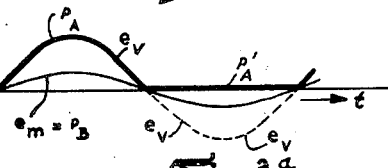
Figures 3 and 4 show voltage diagrams by reference to which the operation of the circuit arrangement shown in Figures 1 and 2 will be made clear.

The operation of the circuit arrangement will now be set out with reference to the potential diagrams shown in Figures 3a, b, c.

In the circuit arrangement shown a direct current in the output circuit can only pass through the rectifier 2 and this only occurs if the potential of the anode of the rectifier 2 or else of point B exceeds the potential of the cathode of the rectifier 2 or else of point A.

If the comparison voltage has a sinusoidal course designated $e_v$ in the time diagram of Figure 3a neither the rectifier 1 nor the rectifier 2 will have current passing through it during the first half-wave of the sinusoidal curve so that during this time the potential point A corresponds with the value given by the instantaneous value of the curve $e_v$, as is denoted in Figure 3a by a thick line at $P_A$.

Figure 3B:

During the second half-wave of the sinusoidal curve $e_v$ the rectifier 1 will be conductive so that there is practically no potential difference between the anode and the cathode of this rectifier. Thus, during this time the potential of point A approximately corresponds with the potential of the anode of the rectifier 1 or else with ground potential, as desigated in Figure 3 by $P'_A$.

The potential of point B relative to ground is governed by the measuring alternating voltage $e_m$ applied to the series combination of the rectifiers. The variation of the potential of point B as a function of time consequently corresponds with the measuring alternating voltage $e_m$.

As appears from Figure 3a, if comparison and measuring alternating voltages are in phase, the potential of point B is always lower than of point A and hence $i_g$ is always 0.

If, however, there is a phase difference of 90° between comparison and measuring voltages (Figure 3b) an output current occurs during the time that corresponds with the cross-hatched part in the figure; at a phase difference of 180° between the voltages (Figure 3c) an output current occurs during the entire second half-wave of the comparison voltage so that the mean output current is at maximum. In the case of phase displacements exceeding 180° the mean value of the output current again diminishes until at a phase difference of 360° $i_g$ again always equals 0.

In the circuit arrangement shown in Figure 1 the cathodes of the rectifiers are interconnected; as an alternative, however, the anodes may be interconnected as in the circuit arrangement shown in Figure 2 in which like parts are designated by references similar to those of Figure 1. 11 and 12 designate the rectifiers, whereas the points corresponding to A and B of Figure 1 are designated C and D respectively.

Figure 4A:
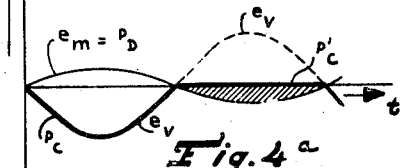

The Figures 4a, b, c associated with Figure 2 correspond to the Figures 3a, b, c associated with Figure 1; in Figure 2, however, the comparison voltage is assumed to be in phase opposition with that of Figure 1.

The occurrence of a current $i_g$ in the output circuit is again designated by cross-hatching in the Figures 4a, b, c. Now, however, the current is oppositely directed to that in the circuit arrangement shown in Figure 1. These figures will otherwise be self-evident after the foregoing.

By combining the respective phase indicator arrangements shown in Figures 1 and 2 a circuit is obtained in which the polarity of the D.-C. output current is reversed by a change of 180° in the phase difference between the applied comparison and measuring voltages. The phase indicator circuit thus formed is therefore particularly suitable to detect in a polar manner a balance disturbance arising in an alternating current bridge circuit.

Figure 5:
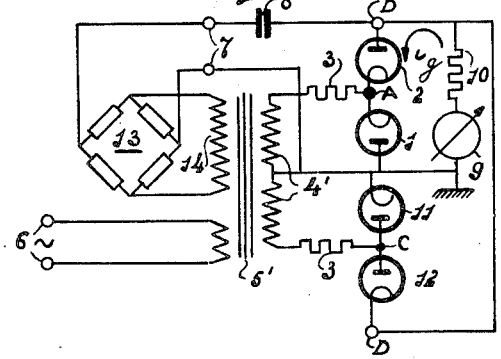
Figure 5 shows a preferred form of a circuit arrangement according to the invention applied to two pairs of rectifiers in an alternating current bridge circuit.

A circuit arrangement of this kind used in an alternating current bridge circuit is shown in Figure 5, corresponding parts being again designated by like references.

This circuit arrangement is formed by interconnecting the grounded points in the circuit shown in Figures 1 and 2. As is apparent from Figures 3 and 4 the measuring alternating voltages in the two circuit arrangements are in phase; this allows the points B and D to be connected directly so that one output circuit and one set of input terminals 7 for the measuring alternating voltage suffices.

Figure 3C:
Figure 4B:
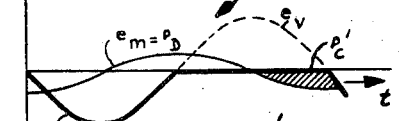

The comparison voltages supplied to the tubes 1 and 11 should be in phase opposition, as is apparent from the Figures 3 and 4. The comparison voltages in phase opposition which can obviously be generated in various ways are obtained from a push-pull centertapped secondary winding 4' of the transformer 5'. The comparison voltage is obtained directly from the power supply circuit to be connected at 6. The measuring alternating voltage supplied to the terminals 7 is developed by the voltage at the measuring diagonal of an alternating current bridge circuit 13 which is fed by means of the tertiary winding 14 of the transformer 5'.

Figure 6:
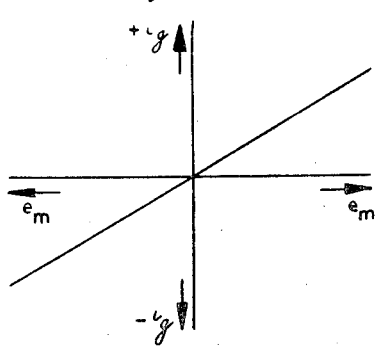
Figure 6 shows the relation between the amplitude of the measuring alternating voltage and the consequent maximum direct current output for the circuit arrangement shown in Figure 5.

If the bridge circuit is in balance the alternating voltage obtained from the measuring diagonal is zero and since the value of the output current of the circuit according to the invention and the amplitude of the measuring alternating voltage at a given comparison voltage are in a linear relation which is shown in Figure 6 an output current or a deflection of the direct current instrument 9 does not occur.

If the bridge balance is disturbed towards one side the curves illustrated in Figures 3a and 4a for example apply to the series combinations 1, 2 and 11, 12 respectively and an output current passes to the direction denoted by an arrow in Figure 5.

Figure 4C:
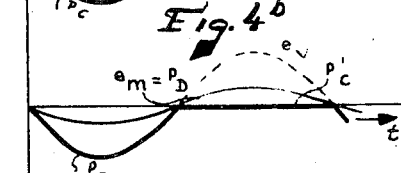

If on the other hand the balance of the bridge circuit is disturbed towards the other direction the relations shown in Figures 3c and 4c apply so that an output current passing in a direction opposite to the arrow in Figure 5 results and the instrument 9 used for zero indication deflects towards the other side as in the preceding case. Any disturbance of the balance of the bridge circuit is thus detected in a polar manner; for the purpose of increasing the indication sensitiveness the voltage obtained from the measuring diagonal of the bridge circuit may, if desired, be amplified directly before being supplied to the terminals 7.

Finally, it must be remarked that the shape of the potential curves for the comparison and measuring alternating voltages is comparatively immaterial; particularly since the use of an amplification of the measuring alternating voltage as referred to hereinbefore permits of utilizing this advantage.

What we claim is:

1. Apparatus for measuring the phase displacement between a first alternating voltage and a second alternating voltage of larger amplitude comprising two rectifiers oppositely connected in a series circuit, means to apply the first alternating voltage across said series circuit, means to apply the second alternating voltage across one of said rectifiers, and direct current indicating means connected in parallel with said series circuit for determining the phase angle between said first and second alternating voltages.

2. Apparatus for measuring the phase displacement between a first alternating voltage and a second alternating voltage comprising two rectifiers oppositely connected in a series circuit, means to apply the first alternating voltage across said series circuit, means to increase the amplitude of said second alternating voltage to a level exceeding the amplitude of said first alternating voltage, means to apply said increased second alternating voltage across one of said rectifiers, and direct current indicating means connected in parallel with said series circuit for determining the phase angle between said first and second alternating voltages.

3. Apparatus for measuring the phase displacement between a first alternating voltage and a second alternating voltage of larger amplitude comprising two diodes each having a cathode and an anode, the cathodes of said diodes being interconnected to form a series circuit of said diodes, means to apply the first alternating voltage across said series circuit, means to apply the second alternating voltage across one of said diodes, and direct current indicating means connected in parallel with said series circuit for determining the phase angle between said first and second alternating voltages.

4. Apparatus for measuring the phase displacement between a first alternating voltage and a second alternating voltage comprising two diodes each having a cathode and an anode, the cathodes of said diodes being interconnected to form a series circuit of said diodes, a capacitor, means to apply the first alternating voltage through said capacitor to said series circuit, a step-up transformer having primary and secondary windings, a current limiting resistor, means to supply said second alternating voltage to said primary winding of said transformer, means to connect said secondary winding of said transformer in series with said resistor across one of said diodes, said transformer being adapted to raise the amplitude of said second alternating voltage applied to said one of said diodes above the amplitude of said first alternating voltage applied across said series circuit, and direct current indicating means connected across said series circuit for determining the phase angle between said first and second alternating voltages.

5. Apparatus for measuring the phase displacement between a first alternating voltage and a second alternating voltage of larger amplitude with respect to said first voltage comprising two diodes each having a cathode and an anode, the anodes of said diodes being interconnected to form a series circuit of said diodes, means to apply the first alternating voltage across said series circuit, means to apply the second alternating voltage across one of said diodes, and direct current indicating means connected in parallel with said series circuit for determining the phase angle between said first and second alternating voltages.

6. Apparatus for measuring the phase displacement between a first alternating voltage and a second alternating voltage comprising two diodes each having a cathode and an anode, the anode of said diodes being interconnected to form a series circuit of said diodes, a capacitor, means to apply the first alternating voltage through said capacitor to said series circuit, a step-up transformer having primary and secondary windings, a current limiting resistor, means to apply the second alternating voltage to said primary winding of said transformer, means to connect said secondary winding of said transformer in series with said resistor across one of said diodes, said transformer being adapted to raise the amplitude of said second alternating voltage applied to said one of said diodes above the amplitude of said first alternating voltage applied across said series circuit, and direct current indicating means connected across said series circuit for determining the phase angle between said first and second alternating voltages.

7. Apparatus for measuring the phase displacement between a first alternating voltage and a second alternating voltage of larger amplitude comprising a first pair of rectifiers oppositely connected in a first series circuit, a second pair of rectifiers oppositely connected in reverse order with respect to said first pair in a second series circuit, said first series circuit being connected in a parallel circuit with said second series circuit, means to apply the first alternating voltage across said parallel circuit, means to apply the second alternating voltage in phase opposition to one rectifier of said first series circuit and to the corresponding rectifier of said second series circuit, and direct current indicating means connected across said parallel circuit for determining in a polar manner the phase angle between said first and second alternating voltages.

8. Apparatus for measuring the phase displacement between a first alternating voltage and a second alternating voltage of larger amplitude comprising a first pair of diodes each having a cathode and an anode, the cathodes being interconnected to form a first series circuit of said first pair of diodes, a second pair of diodes each having a cathode and an anode, the anodes being interconnected to form a second series circuit of said second pair of diodes, said first series circuit being connected in a parallel circuit with said second series circuit, means to apply the first alternating voltage across said parallel circuit, means to apply the second alternating voltage in phase opposition across one diode in said first series circuit and across the corresponding diode of said second series circuit, and a center-zero direct current indicating device connected across said parallel circuit for determining in a polar manner the phase angle between said first and second alternating voltages.

9. Apparatus for measuring the phase displacement between a first alternating voltage and a second alternating voltage comprising a first pair of diodes each having a cathode and an anode, the cathodes being interconnected to form a first series circuit of said first pair of diodes, a second pair of diodes each having a cathode and an anode, the anodes being interconnected to form a second series circuit of said second pair of diodes, said first series circuit being connected in a parallel circuit with said second series circuit, means to apply the first alternating voltage across said parallel circuit, a voltage step-up transformer having a primary winding and a center-tapped secondary winding, a pair of current limiting resistors, means to apply the second alternating voltage to the primary winding of said transformer, means to connect one half of said secondary winding of said transformer through one of said resistors across one diode in said first series circuit and to connect the other half of said secondary winding through the other of said resistors across the corresponding diode in said second series circuit whereby the second alternating voltage is applied to said diodes in phase opposition, said transformer being adapted to raise the amplitude of said second alternating voltage above the amplitude of said first alternating voltage, and a center-zero direct current indicating device connected across said parallel circuit for determining in a polar manner the phase angle between said first and second alternating voltages.

10. Apparatus for measuring the phase displacement between a first alternating voltage which is derived from across the output diagonals of an alternating current bridge and a second alternating voltage which is applied across the input diagonals of said bridge, said apparatus comprising a first pair of diodes each having a cathode and an anode, the cathodes being interconnected to form a first series circuit of said first pair of diodes, a second pair of diodes each having a cathode and an anode, the anodes being interconnected to form a second series circuit of said second pair of diodes, said first series circuit being connected in a parallel circuit with said second series circuit, means to apply the first alternating voltage across said parallel circuit, a voltage step-up transformer having a primary winding, a center-tapped secondary winding and a tertiary winding, means to apply the second alternating voltage to said primary winding of said transformer, means to connect said tertiary winding to the input diagonals of the alternating current bridge whereby said second alternating voltage provides an input voltage to said bridge, a pair of current limiting resistors, means to connect one half of said secondary winding through one of said resistors across one diode in said first series circuit and to connect the other half of said secondary winding through the other of said resistors across the corresponding diode in said second series circuit whereby the second alternating voltage is applied to the diodes in push-pull phase relation, and a zero-center direct current indicating device connected across said parallel circuit for determining in a polar manner the phase angle between said first and second alternating voltages to thereby find the direction of unbalance in said bridge.

CORNELIS DORSMAN.
PIETER HEERTJE DIJKSTERHUIS.

REFERENCES CITED

The following references are of record in the file of this patent:

UNITED STATES PATENTS

| Number | Name | Date |
|---|---|---|
| 2,225,348 | Mikelson | Dec. 17, 1940 |
| 2,335,265 | Dodington | Nov. 30, 1943 |

FOREIGN PATENTS

| Number | Country | Date |
|---|---|---|
| 484,775 | Germany | Oct. 22, 1929 |
| 570,287 | Germany | Apr. 4, 1930 |